Figure 1:
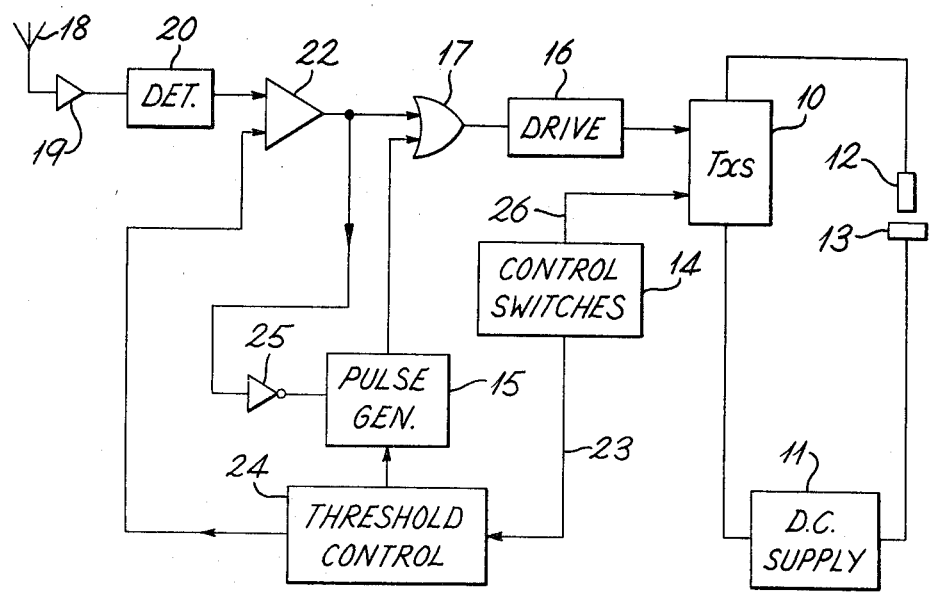

United States Patent [19]

El-Menshawy et al.

[11] 4,443,680
[45] Apr. 17, 1984

[54] METHODS AND APPARATUS FOR ELECTRICAL DISCHARGE MACHINING

[76] Inventors: Mohamed F. El-Menshawy, 5 Guiting Rd., Selly Oak, Birmingham 29; Sushantha K. Bhattacharyya, 35 Chelsea Ct., Abdon Ave., Birmingham 29, both of England

[21] Appl. No.: 249,406

[22] Filed: Mar. 31, 1981

[30] Foreign Application Priority Data

Apr. 2, 1980 [GB] United Kingdom ............... 8011003
Apr. 21, 1980 [GB] United Kingdom ............... 8013002

[51] Int. Cl.³ .............................................. B23P 1/08
[52] U.S. Cl. .................... 219/69 C; 219/69.5; 219/69.6
[58] Field of Search ............... 219/69 M, 69 C, 69 G, 219/69 R, 69 P, 69 S

[56] References Cited

U.S. PATENT DOCUMENTS 3,705,286 12/1972 Kondo et al.
4,321,451 3/1982 Inoue ................................. 219/69 G
4,322,595 3/1982 Fowell et al. .................... 219/69 C

FOREIGN PATENT DOCUMENTS

WO79/00379 6/1979 PCT Int'l Appl.
1323968 7/1973 United Kingdom .
1330418 9/1973 United Kingdom .
1334660 10/1973 United Kingdom .
1413893 11/1975 United Kingdom .
1492027 11/1977 United Kingdom .
1494992 12/1977 United Kingdom .

OTHER PUBLICATIONS

S. K. Bhattacharyya et al., "Monitoring the E.D.M. Process by Radio Signals," Int. J. Prod. Res., 1978, vol. 16, No. 5, pp. 353-363.

Primary Examiner—M. H. Paschall
Attorney, Agent, or Firm—Cushman, Darby & Cushman

[57] ABSTRACT

Some forms of EDM employ monitoring of sparking in the gap between an electrode and a workpiece to control the machining process but difficulties arise in providing a threshold which when applied to the monitoring signal indicates the onset of arcing. This problem has been found to be due to the change in amplitude which occurs with gap current in monitoring signals derived in some ways. The invention uses a threshold control circuit to provide a variable reference signal for a comparator which compares the monitoring and reference signals, the magnitude of the reference signal varying inversely with the gap current. The output of the comparator determines by way of a drive circuit and transistors whether or not voltage is applied between an electrode and a workpiece.

11 Claims, 5 Drawing Figures

METHODS AND APPARATUS FOR ELECTRICAL DISCHARGE MACHINING

The present invention relates to the methods and apparatus for conventional electrical discharge machining (EDM) (otherwise known as spark erosion machining) in which a train of current pulses is passed across a gap between an electrode and a workpiece immersed in a dielectric liquid, and also for the type of EDM described in International Application No. PCT/GB78/00051 published under International Publication No. WO 79/00379 on June 28, 1979, and from which the present applicants derived their earlier copending PCT/USA National application Ser. No. 154,411 in which the formalities were completed under 35 USC 371 on Aug. 6, 1979.

Briefly the above application describes a technique for EDM in which an uninterrupted unidirectional voltage is applied to a gap between an electrode and a workpiece until monitoring indicates that sparking in the gap has degenerated to arcing, or that arcing is imminent, the voltage then being removed for an interval sufficient to allow at least some dispersion of ionisation in the gap before being re-applied.

According to a first aspect of the present invention there is provided an EDM machine comprising voltage application means for applying voltages between an electrode and a workpiece, reference means for generating a variable reference signal which depends on current (real or potential) in the gap between the electrode and the workpiece, and which decreases with increase in the said current and vice versa at least over part of the range of the said current, monitoring means for generating a monitoring signal representative of the degree of sparking occurring in the gap, comparison means for comparing the monitoring and reference signals and means for, at least partially, controlling the operation of the EDM machine in accordance with the output signal of the comparison means.

The means for controlling the operation of the EDM machine may be constructed to so control the voltage application means that, in operation, voltage is applied between the electrode and the workpiece intermittently or without interruption if the comparison means indicates a predetermined relationship between the monitoring and reference signals indicative of satisfactory sparking in the gap, and voltage is also applied between the electrode and the workpiece if an interval of at least a predetermined duration has elapsed since the voltage was last applied between the electrode and the workpiece, but no voltage capable of causing significant machining is applied between the electrode and the workpiece at other times.

According to a second aspect of the present invention there is provided a method of EDM machining comprising applying a voltage across a gap between an electrode and a workpiece generating a variable reference signal which depends on the current (potential or real) in the gap and which increases with decrease in the said current and vice versa at least over part of the range of the said current, applying a voltage across the gap, generating a monitoring signal representative of the degree of sparking occurring in the gap, comparing the monitoring and reference signals, and controlling an aspect of the machining being carried out in accordance with the comparison made between the monitoring and reference signals.

The voltage may be applied continuously or intermittently across the gap while comparison between the monitoring and reference signals indicates satisfactory sparking in the gap, a voltage also being applied to the gap if an interval of at least a predetermined duration has elapsed since voltage was last applied thereto, but no voltage capable of causing significant machining being applied between the electrode and the workpiece at other times.

The present invention is based on the discovery by the inventors that the level of radiofrequency (RF) signal radiated from the gap depends on the current passing through the gap in addition to the degree of sparking in the gap. Surprisingly at least over typically about half of the said range, the more current passing through the gap the lower the RF signal level. Difficulty is therefore experienced in fixing a level for the magnitude of the monitoring signal which indicates when arcing has commenced or is imminent.

The present invention overcomes this problem by deriving a variable reference signal which depends on current (potential or real) passing through the gap and using this signal as a reference to determine when the monitoring signal indicates a low degree of sparking in the gap.

Preferably the said interval is sufficient to allow dispersion of ionisation in the gap. The predetermined relationship is preferably that the monitoring signal is greater than the reference signal.

Apparatus according to the invention may, when the reference signal depends on the potential current in the gap, include current control means which can be set to select, within a predetermined range, the machining current to be passed through the gap. Similarly the method according to the invention may include selecting, from within a predetermined range, the machining current which can be passed through the gap. In both apparatus and method setting the gap current may determine the reference signal.

In most EDM machines a number of transistors (or other semiconducting devices) are connected between a d.c. supply and the gap, these transistors being enabled when a voltage is to be applied to the gap. The number of transistors or other devices in use at any time is determined by the EDM machine operator who selects the number of transistors using a manually operated switching means. Thus in these machines the current control means comprises the switching means for selecting the number of transistors capable of conduction at any time.

If the reference signal depends on the actual current in the gap, the apparatus according to the invention may include means for measuring the gap current, for example by measuring the current supplied to the electrode or the workpiece, the reference signal then varying in accordance with the current measured. Similarly the method of the invention may include measuring the current in the gap.

Monitoring sparking in the gap can be carried out in several ways, for example by using an antenna to pick up RF signals radiated from the gap, or by using a direct connection to the electrode and the workpiece to obtain RF signals, or by receiving ultrasonic radiation from the gap, or by receiving light radiation from the gap.

The voltage application means may include timing means for determining the said interval between the last application of voltage across the gap and the re-application of the voltage, and the timing means may be so constructed that the said interval depends on the potential current in the gap or on a recent gap current, preferably the last gap current. Similarly in the method according to the invention the said interval may depend on the potential current or on a recent gap current.

Where voltages are applied between the electrode and the workpiece intermittently when sparking is at a satisfactory level, the voltages are preferably periodic.

Since sparking in the gap will not occur at all or be at a low level during a short circuit or an open circuit between the electrode and the workpiece, the monitoring signal can also be used to control the application of voltage under these conditions.

Figure 2:
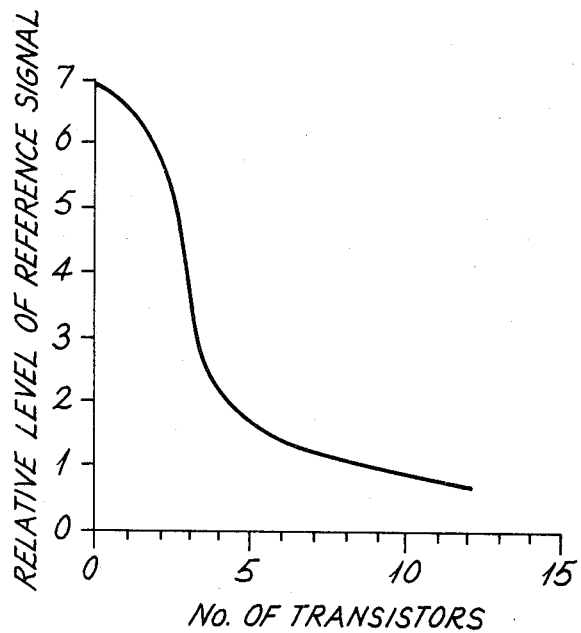
Figure 3:
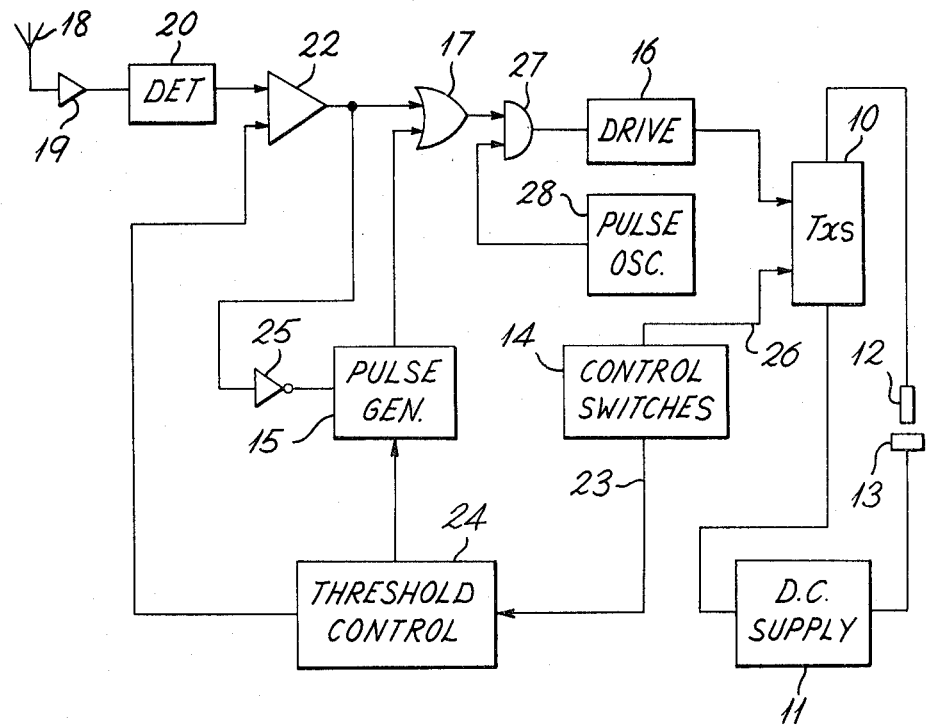
Figure 4:
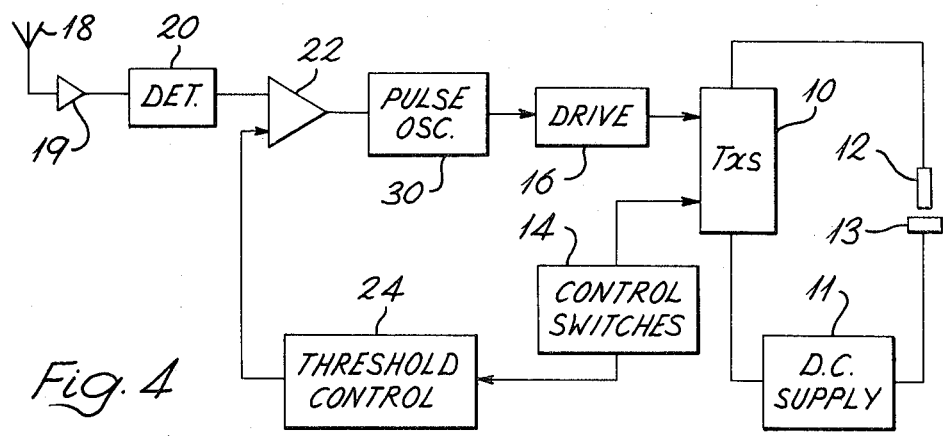
Figure 5:
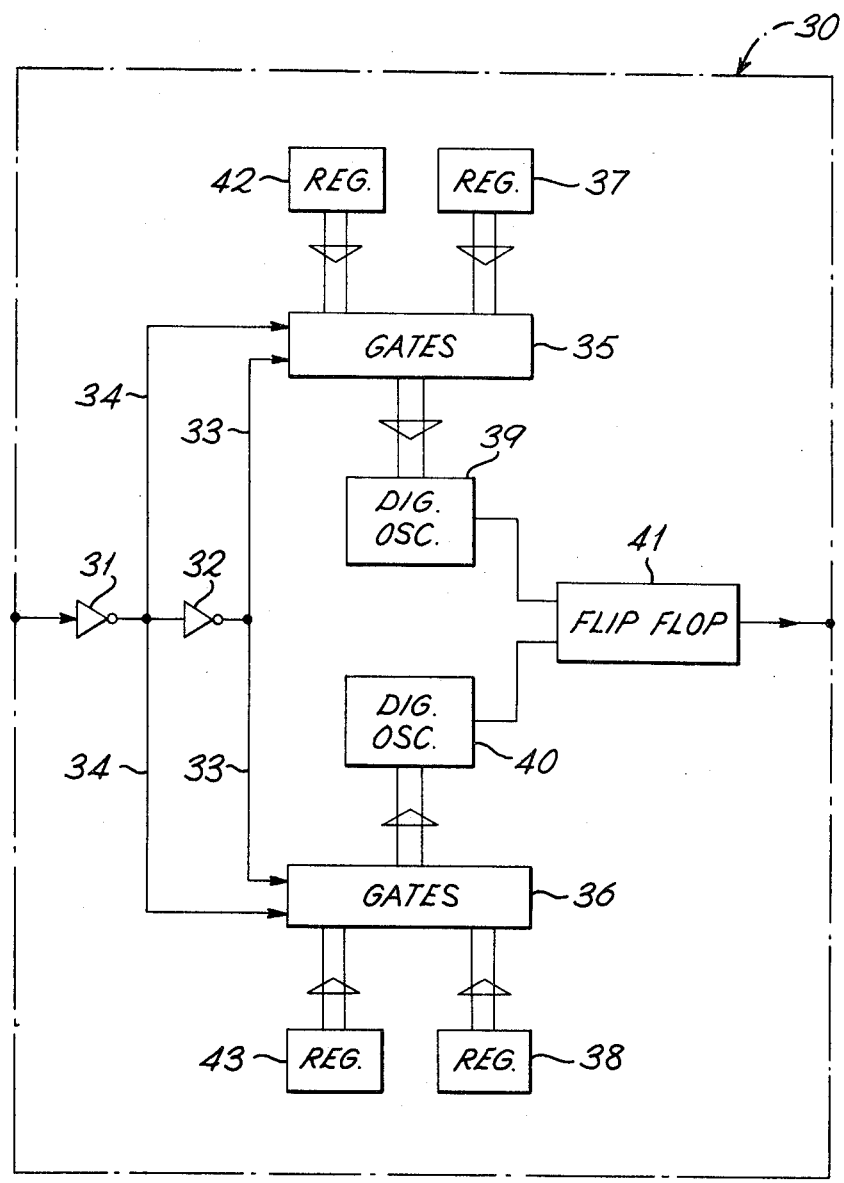

An embodiment of the invention will now be described with reference to the accompanying drawings, in which:

FIG. 1 is a block diagram of part of the electrical circuit for an EDM machine according to the invention, FIG. 2 is a graph showing the relation between number of transistors in operation and threshold level for the circuit of FIG. 1, FIG. 3 is a block diagram of part of the electrical circuit for another EDM machine according to the invention, FIG. 4 is a block diagram of the electrical circuit for another EDM machine according to the invention and, FIG. 5 is a more detailed block diagram of part of FIG. 4.

In FIG. 1, a circuit 10 comprising a bank of parallel connected transistors is used to connect a d.c. electrical supply across a gap between an electrode 12 and a workpiece 13 immersed in a dielectric liquid (not shown) to allow electrical discharge machining of the workpiece. A group of manual control switches 14 is used to select the number of transistors connected in parallel between the d.c. supply 11 and the electrode 12, the switches being connected to the circuit 10 by way of a group of connections 26. For example in a typical machine the number of transistors which may be connected can vary from one to twenty and in addition the biassing of one transistor can be arranged so that by means of the control switches 14 that transistor is partly biassed into operation instead of being saturated so that by means of different switches conduction can be made equivalent to 0.2, 0.4, 0.6 and 0.8 that of a single saturated transistor. Thus the effective range of current selection is from 0.2 to twenty times the saturation current of the transistors used in the bank 10. The switches may be push buttons and connected so that a single transistor partially conducts by different amounts in response to different buttons, and other buttons enable one or a combination of transistors. To realise a desired current a combination of buttons may be pressed. Each transistor typically supplies approximately 3A to the gap.

On switch-on a pulse generator 15 generates a pulse typically 1.5 msecs after energisation. This pulse is applied to a drive circuit 16 for the transistors in the bank 10 by way of an OR gate 17, with the result that any transistors which are activated by means of the switches 14 are triggered into conduction and a voltage is applied between the electrode 12 and the workpiece 13. If conditions are correct sparking will occur in the gap between the electrode and the workpiece and the RF signal from this sparking will be picked up by an antenna 18 and will then be detected in a detector circuit 20 after amplification by an amplifier 19.

The output of the detector circuit 20 is applied to a differential amplifier 22 acting as a comparator. The other input for the amplifier 22 is determined by the number of transistors selected using the switches 14. A group 23 of connections allows the switches 14 to set up a voltage in a threshold control circuit 24 which is dependent on the transistors selected and is applied to the input of the comparator 22. The threshold control circuit and the voltage produced are discussed in more detail below. If the output from the detector circuit 20 is higher than the threshold level from the threshold circuit 24, the comparator 22 provides a signal for the OR gate 17 which ensures that the drive circuit 16 keeps transistors in the bank 10 in the conduction state.

After a time which depends on circumstances, sparking in the gap between the electrode and the workpiece degenerates to arcing and at this point there is a marked drop in the radiofrequency signal received by the antenna 18 so that the output of the detector circuit 20 falls below the threshold level from the control circuit 24 and the enabling signal from the output of the comparator 22 to the drive circuit 16 ceases. At this point transistors in the bank 10 are switched off and the voltage across the electrode and the workpiece is removed.

The enabling signal which appears at the output of the comparator 22 during sparking is applied to an inverter 25 so that the pulse generator 15 is inhibited. When the comparator 22 ceases to enable the drive circuit 16 the inverter 25 enables the pulse generator 15 and after an interval which depends on the setting of threshold control circuit 14, the pulse generator passes an enabling signal by way of the OR gate 17 to the drive circuit 16 and the transistors once again come into operation.

Thus if conditions in the gap between the electrode and the workpiece are correct the voltage is applied continuously across the gap until arcing occurs when it is removed for an interval sufficient to allow at least some dispersion of ionisation in the gap before being re-applied. The circuit usually alternates between variable duration intervals in which voltage is continuously applied to the gap and intervals in which the voltage is removed from the gap. Should conditions be incorrect for sparking when voltage is re-applied to the gap insufficient signal will be received by the antenna 18 to provide an enabling signal from the comparator 22 and the transistors in the bank 10 will cease to conduct at the end of the pulse from the generator 15. A further pulse from this generator will then be produced after another interval and at some time sparking will be re-established in the gap and the voltage applied thereto will be maintained while sparking occurs.

The conditions which allow sparking in the gap are well known to those in the art and depend on the size of the gap, the rate at which the electrode is fed towards the workpiece, the amount of contamination in the dielectric, the amount of current which passes through the gap and the magnitude of voltage applied to the gap. Appropriate conditions for machining can be set using controls for these quantities by an operator. Typically the operator refers to a manual of instructions for setting up his machine according to the type of workpiece being machined and the finish required.

The surprising effect, which has already been mentioned, observed by the present inventors is that when the current passed through the gap is comparatively low the level of radiofrequency signal radiated by the gap is comparatively high and vice versa. FIG. 2 can therefore be regarded in two ways, firstly as indicating the level of RF signal generated versus current or number of transistors selected; and secondly as the level of reference signal required to be generated by the threshold control circuit 24 in accordance with the number of transistors selected. Absolute levels are not given in FIG. 2 since such levels clearly depend on machining conditions and circuit conditions but the curve of FIG. 2 indicates that typically the threshold level must be increased by a factor of between six and seven when the number of transistors selected is reduced from ten to one. In a machine having more than ten transistors, it has been found that there is not much change in RF level over the range ten to twenty transistors and for this reason there is no change in the reference signal over this range.

The threshold control circuit 24 may comprise a group of potentiometers with the tap of each potentiometer connected through a respective gate to the comparator 22. The connections 23 enable one gate from the switches 14, the gate enabled corresponding to the number of transistors selected. Each potentiometer is adjusted to give a threshold voltage appropriate to conduction by a respective number of transistors.

In another form of threshold circuit the current in the gap is measured by means of a resistor (not shown) connected in series with the electrode 12. The voltage across the resistor is used to enable one of the above mentioned gates to be selected so that the voltage from one of the potentiometers in the above mentioned group is connected as the threshold voltage.

The threshold circuit 24 also contains two further potentiometers with taps connected by gates to the pulse generator 15. Each of these potentiometers applies a voltage controlling the mark/space ratio of the generator 15, one causing the generator to provide pulses of 50 $\mu$sec. duration spaced by intervals of 1.5 msecs., and the other giving pulses of 10 $\mu$sec. duration spaced by 300 $\mu$sec. intervals. The potentiometer giving the former mark/space ratio is gated to the pulse generator when transistors capable of supplying more than 6A are selected and the potentiometer corresponding to the latter mark/space ratio is gated when the transistors can supply up to 6A only. Clearly the circuits 15 and 24 could be arranged so that more than two mark/space ratios were generated with varying numbers of transistors selected.

The block diagram of FIG. 3 is similar to that of FIG. 1 except that it allows pulsed EDM to be carried out, in that trains of current pulses are passed across the gap between the electrode 12 and the workpiece 13, pulse trains being interrupted when the monitoring signal at the output of the detector 20 falls below the variable threshold signal from the threshold control circuit 24.

An AND gate 27 is interposed between the OR gate 17 and the drive circuit 16 and a pulse oscillator 28 is also connected to one input of the AND gate 27. The pulse oscillator 28 generates pulses of the required duration and repetition frequency for machining, and pulse duration and/or the intervals between the pulses are variable under manual control.

The time constant of the detector 20 is such that the output of the comparator 22 is maintained for a time sufficient to bridge the interval between pulses from the oscillator 28. Since the ratio of 'on' time to 'off' time of the pulses from the oscillator 28 is often 10:1, this bridging does not prevent pulses applied to the gap being interrupted if arcing occurs. Where the pulse generator 15 generates a pulse 1.5 msecs after triggering the time constant of the detector may be 800 $\mu$secs.

Thus, in operation, while sparking continues the AND gate 27 enables the drive circuit 16 when pulses occur at the output of the pulse oscillator 28. However when arcing or a short circuit occur the monitoring signal falls, after the time due to the time constant, to a low level and the comparator 22 no longer provides an enabling signal for the AND gate 27 by way of the OR gate 17. Pulses from the oscillator 28 cannot reach the drive circuit 16 and machining ceases. After a further interval, preferably sufficient to allow at least significant dispersion of ionisation in the gap, the pulse generator 15 provides an enabling pulse to the OR gate 17 and thence to the AND gate 27 which is long enough to be coincident with a pulse from the oscillator 28. Thus the drive circuit switches on the transistors 10 and a voltage is applied to the gap. If sparking starts the AND gate 27 is enabled by the detector 20 and further pulses from the oscillator 28 control the application of pulses to the gap. However, if sparking does not start the AND gate 27 closes at the end of the pulse from the generator 15 and a further interval occurs, allowing more dispersion of ionisation on clearance of contaminated dielectric liquid, until the generator 15 generates a further pulse.

Another embodiment of the invention is now described in which pulses are applied to the gap during sparking and test pulses are applied when arcing has occurred. However unlike the arrangement of FIG. 2 what is, in effect, a single oscillator is employed.

In FIG. 4 a pulse oscillator 30 replaces the oscillators 15 and 28, and the associated circuits 17 and 27. When the output of the comparator 22 indicates sparking the pulse oscillator 30 generates pulses having a mark/space ratio suitable for machining but when the comparator indicates the onset of arcing a different mark/space ratio is employed, for example an on time of 10 $\mu$sec. and an off time of 2 msecs. If after any of the pulses generated with the latter mark/space ratio, sparking occurs, it is detected by the monitoring circuit and the comparator output changes causing the former mark/space ratio to be generated.

The pulse oscillator 30 is shown in more detail in FIG. 5. The output from the comparator 22 which may be an integrated circuit type LM311, is applied to an inverting buffer amplifier 31 and then to an inverter 32. During sparking signals at "high" level from the inverter 32 applied by way of connections 33 reach groups of gates 35 and 36 and as a result the contents of registers 37 and 38 reach digital oscillators 39 and 40, respectively. Thumbwheel switches (not shown) are used to set the contents of the registers 37 and 38 to select "on" and "off" times, respectively, in the range 1 to 9999 $\mu$secs. The digital oscillator 39 controls the "on" time of a flip-flop circuit 41 while the oscillator 40 controls the "off" time. When the onset of arcing occurs the output from the buffer 31 goes "high" while that from the inverter 32 goes "low", and as a result "high" level signals by way of connections 34 reach the groups of gates 35 and 36, and the contents of registers 42 and 43 are applied to the digital oscillators 39 and 40, respectively. The contents of the registers 42 and 43 are such that pulses with a mark/space ratio, such as that mentioned above, suitable for "test" pulses in the period following the onset of arcing are generated.

The following integrated circuits may be used in FIG. 5: gates 35 and 36—type 4019, digital oscillators 39 and 40—type 4059, flip-flop circuit 41—type 4013.

The circuits of FIGS. 4 and 5 may also be used with a fixed reference signal for the comparator 22.

The circuits of FIGS. 1, 3 and 4 and 5 also control the application of gap voltage when open circuits or short circuits occur in the gap since, apart from test pulses originating from the pulse generator 15, voltages are not applied if these conditions occur.

From the specifically described embodiments of the invention it will be clear that the invention can be put into operation in many different ways. For example the threshold control circuit can provide its characteristics in other ways from that described so long as it follows the general trend of an inverse relationship between gap current and threshold level, over at least part of the gap current range. Any of the known ways of monitoring sparking in the gap can be employed, particularly those mentioned above. A different circuit in overall construction and detail can be employed to control gap current provided it follows the general principles of the present invention. Other aspects of machining can also, or alternatively, be controlled in accordance with the potential or actual gap current, for example the feed rate of the electrode 12 towards the workpiece, the size of the gap and the mark/space ratio of pulses applied to the gap.

We claim:

1. An EDM machine comprising:
    voltage application means for applying voltages between an electrode and a workpiece to cause sparking in the gap between the electrode and the workpiece,
    reference means for generating a variable reference signal which depends on the current in the gap when sparking occurs and which has non-zero values which increase in value with increase in the said current and vice versa at least over part of the range of the said current,
    monitoring means for generating a monitoring signal having a value representative of the amount of sparking currently occurring in the gap,
    comparison means for comparing the monitoring and reference signals to provide an output signal indicating the onset of arcing when the value of the monitoring signal falls below a variable threshold level determined by the value of the reference signal, and
    means for, at least partially, controlling the operation of the EDM machine in accordance with the output signal of the comparison means.

2. An EDM machine according to claim 1 wherein the means for controlling the operation of the EDM machine is constructed to so control the voltage application means that, in operation, voltage is applied between the electrode and the workpiece intermittently or without interruption if the comparison means indicates a predetermined relationship between the monitoring and reference signals indicative of satisfactory sparking in the gap, and voltage is also applied between the electrode and the workpiece if an interval of at least a predetermined duration has elapsed since the voltage was last applied between the electrode and the workpiece, but no voltage capable of causing significant machining is applied between the electrode and the workpiece at other times.

3. An EDM machine according to claim 1 including current control means which can be set to select, within a predetermined range, the machining current to be passed through the gap,
    the reference signal generated by the reference means depending on the setting of the current control means.

4. An EDM machine according to claim 1 including means for measuring the gap current,
    the reference signal generated by the reference means depending on the measured current.

5. An EDM machine according to claim 1 wherein the monitoring means employs at least one of the following: RF signals radiated from the gap, RF signals across the gap sensed by way of direct connections to the electrode and workpiece, ultrasonic radiation from the gap, and light radiation from the gap.

6. An EDM machine according to claim 2, wherein the voltage application means include
    timing means for determining the said interval between the last application of voltage across the gap and the re-application of the voltage,
    the timing means being so constructed that the said interval depends on a recent gap current.

7. An EDM machine according to claim 2, wherein the means for controlling the operation of the machine comprises
    an OR gate having one input coupled to enable the OR gate when the output of the comparison means indicates satisfactory sparking,
    drive means with input coupled to the output of the OR gate and with output coupled to cause voltage to be applied across the gap when the OR gate is enabled, and
    a pulse generator connected to provide, when the comparison means indicates an unsatisfactory level of sparking in the gap, an enabling signal for the OR gate at the end of the said interval.

8. An EDM machine according to claim 7 wherein the means for controlling the operation of the machine also includes
    a pulse oscillator having a mark/space ratio suitable for machining, and
    an AND gate coupled between the OR gate and the drive means, the AND gate being connected to be enabled by signals from the OR gate when applied at the same time as signals from the said pulse oscillator.

9. An EDM machine according to claim 1, wherein the means for controlling the operation of the machine comprises
    drive means for causing voltage to be applied across the gap, and
    a pulse oscillator with output coupled to the input of the drive means, the pulse oscillator having selectable first and second modes of operation in which first and second mark/space ratios, respectively, occur, and the pulse oscillator being coupled to the output of the comparison means and so constructed that the first mark/space ratio occurs when sparking in the gap is satisfactory and the second mark/space ratio occurs at other times.

10. An EDM machine according to claim 2 wherein the said interval is sufficient to allow dispersion of ionisation in the gap.

11. A method of EDM machining comprising the steps of:

applying a voltage across the gap between an electrode and a workpiece to cause sparking in the gap, generating a variable reference signal which depends on the current passing through the gap when sparking occurs and which has non-zero values which increase in value with decrease in the said current and vice versa at least over part of the range of the said current, generating a monitoring signal having a value representative of the amount of sparking currently occurring in the gap, comparing the monitoring and reference signals to provide an output signal indicating the onset of arcing when the value of the monitoring signal falls below a variable threshold level determined by the value of the reference signal, and controlling an aspect of the machining being carried out in accordance with the comparison made between the monitoring and reference signals.

* * * * *